Feb. 9, 1937. P. J. McCULLOUGH 2,070,290
ELECTRIC COOKING APPLIANCE
Filed Nov. 8, 1934 2 Sheets-Sheet 1
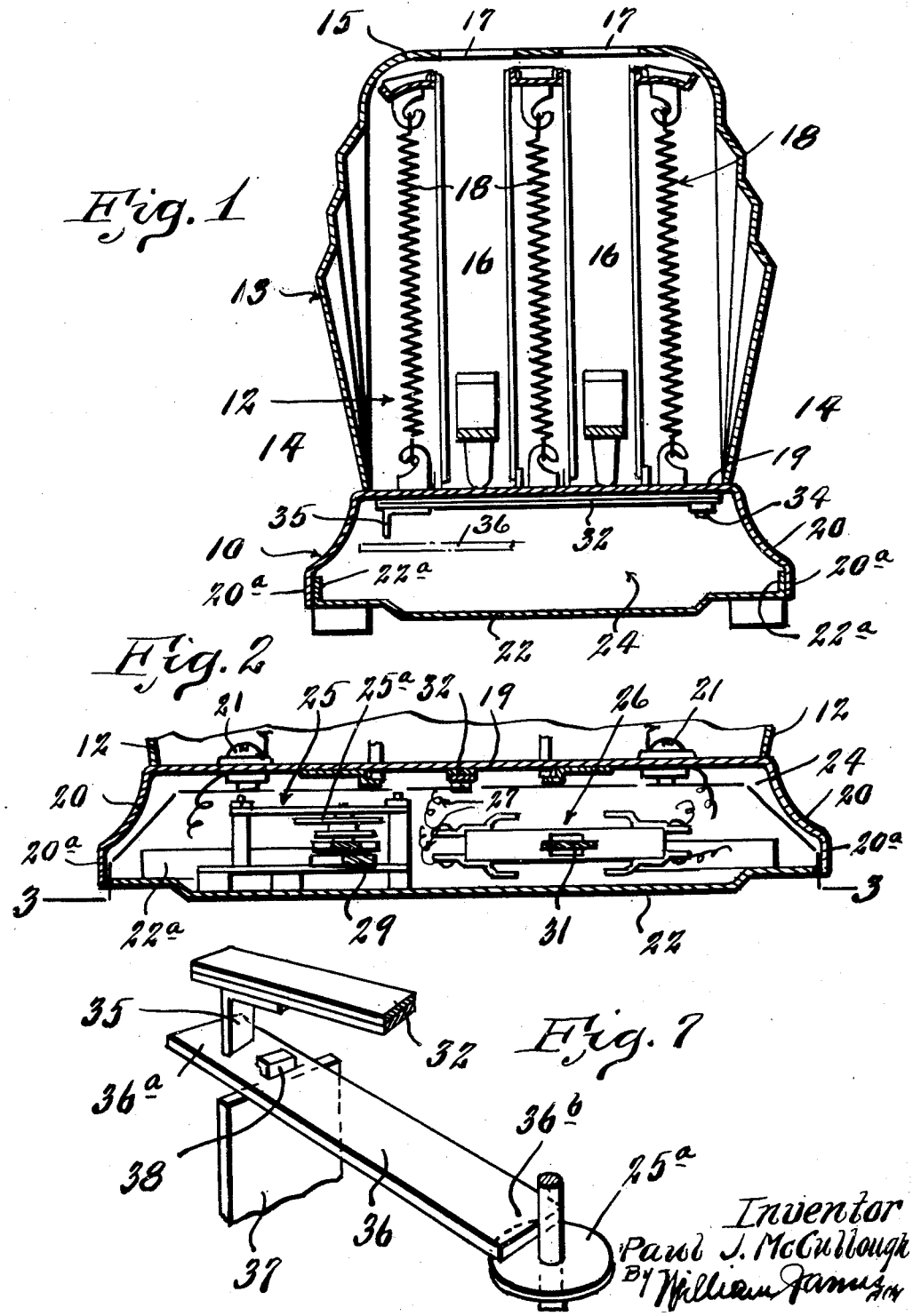
Inventor
Paul J. McCullough
By William James

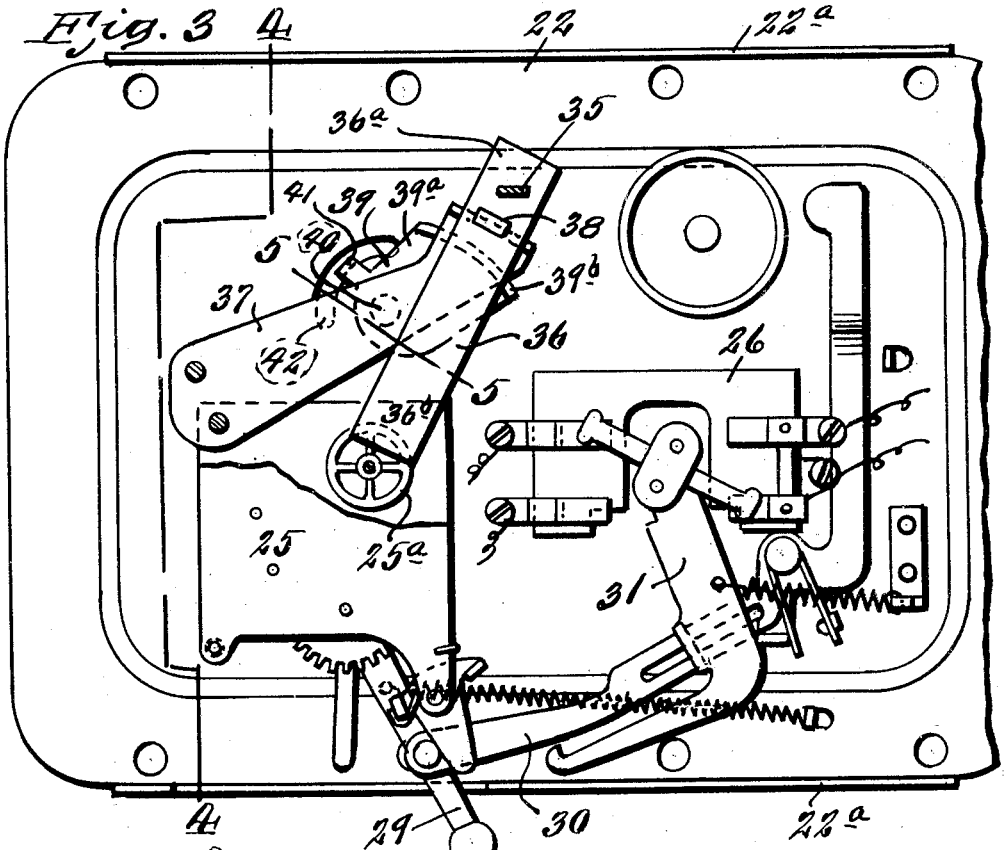

UNITED STATES PATENT OFFICE 2,070,290

ELECTRIC COOKING APPLIANCE

Paul J. McCullough, St. Louis, Mo., assignor to Joseph Pavelka, St. Louis, Mo.

Application November 8, 1934, Serial No. 751,981

3 Claims. (Cl. 219—19)

This invention relates to new and useful improvements in electric cooking appliances.

In the operation of electric cooking appliances, such as toasters equipped with timing mechanism, the electric current used to energize the heating element is automatically turned off or reduced after a predetermined length of time or cooking interval. Generally the length of this interval is regulated by a manually operable member. However, this time interval once adjusted remains constant regardless of the temperature conditions of the cooking appliance. Thus if the appliance, such as a toaster, is set for the regular toasting interval, the first slices of toast will be underdone due to the fact that the toaster was cold during the initial operation. On the other hand, if the time interval is stepped up to prolong the toasting operation to take care of the unheated toaster during the initial operation, the toast will be burned in subsequent operations unless care is exercised to reduce the timing interval after the toaster becomes heated.

The objects of the present invention are to obviate these objectional features and provide an electric cooking appliance wherein the time interval remains constant and commences only after the appliance has been properly heated so that no adjustment, either during the initial or subsequent cooking operations, are necessary.

Another object of the invention is to provide an electric toaster having its electric heating elements controlled by a timing mechanism which determines the toasting interval and having a thermostat for controlling the timing mechanism so that the latter does not become operative until the toaster reaches its optimum temperature.

Further objects of the invention are to provide an electric toaster having a high and low heat and a timing mechanism manually operable for turning on said high or toasting heat for a predetermined length of time, said timing mechanism being automatically operable to disconnect said high heat after a predetermined length of time and turn on low heat, and a thermostat for controlling said timing mechanism whereby the latter becomes operative only when the temperature of the toaster has reached its proper toasting temperature.

Still further objects of the invention are to provide an electric cooking appliance having a switch for controlling the electric circuit thereof and having a manually operable timing mechanism for actuating said switch to close said circuit simultaneously with the manual operation of said timing mechanism, said timing mechanism being adapted automatically to actuate said switch to open said circuit after a predetermined length of time, said appliance being provided with a temperature responsive means for controlling said timing mechanism and rendering it inoperative until the temperature of the appliance is raised to a predetermined degree, whereupon said timing mechanism is released to operate for a predetermined length of time before the automatic operation of said switch takes place.

Other objects of the invention are to provide an electric cooking appliance having an automatic timing mechanism for shutting off the heat generating medium after a predetermined length of time and having a thermostat for engaging said timing mechanism and holding it inoperative until the temperature of the appliance is raised to a predetermined degree so that the operation of said timing mechanism is subsequent and dependent upon the actuation of the thermostat and takes place only after the temperature of said appliance has reached a predetermined degree.

With these and other objects in view, my invention consists in certain novel features of construction and arrangement of parts, hereinafter more fully described and claimed, and illustrated in the accompanying drawings, in which—

Figure 1 is a vertical transverse cross section through my improved toaster.

Figure 2 is a fragmental longitudinal cross section taken on line 2—2 of Figure 1.

Figure 3 is an enlarged horizontal cross section taken on line 3—3 of Figure 2.

Figure 4 is an enlarged detail cross section taken on line 4—4 of Figure 3.

Figure 5 is a detail cross section taken approximately on line 5—5 of Figure 3.

Figure 6 is a fragmental detail view, looking against the underside of the toaster, and showing the indicating means used with the thermostat adjusting means.

Figure 7 is a perspective view of the thermostat operated means.

My invention is applicable to any electric cooking appliance having timing mechanism for automatically shutting off current after a predetermined length of time. In the present instance it is shown as applied to an electric toaster of the type disclosed in a copending application Serial No. 725,237, filed May 12, 1934.

Briefly stated, this toaster consists of a base 10 to which are attached end walls 12 and a U-shaped member 13 forming side walls 14 and a top wall 15 of the toaster casing. The toaster in the present case is formed with two toasting compartments 16 and the top wall 15 is provided with two openings 17 to provide access to said compartments. A plurality of heating elements 18 is disposed in the toaster, the two outer elements being arranged each to one side of opening 17 in spaced-apart relation with the side walls 14 and the third heating element being disposed centrally in a vertical plane intermediate said openings.

Base 10 is formed with a horizontal wall 19 and a downwardly presented marginal flange 20. Wall 19 forms the bottom wall of the toaster casing and of the toasting compartments. The heating elements 18 are supported in vertical positions in said casing in any suitable manner and the ends of said elements are connected to the respective binding posts 21 which are secured in said wall 19 and project therethrough.

A plate 22 is detachably arranged within the marginal flange 20 of base 10 in spaced relation with the bottom wall 19, thereby forming a chamber 24 for receiving a timing mechanism 25 and a switch 26 both of which are secured to said plate 22.

The latter is provided on its sides with integral upwardly presented longitudinal flanges 22a which fit within the longitudinally disposed members 20a of flange 20. A plurality of wire connections 27 connects the switch with the binding post 21 and the switch is connected to terminal posts 28 which are adapted to receive a suitable plug of a flexible connection (not shown) whereby the toaster can be connected to the supply lines.

The timing mechanism 25 may be of any suitable construction and consists preferably of a suitable clockwork mechanism including a spring adapted to be manually energized by the operation of a lever 29. This lever is operatively connected by a link 30 to the operating lever 31 of switch 26 so that when the timing mechanism is set in operation by the manual operation of lever 29, switch 26 is simultaneously actuated to close the circuit of the heating elements and generate heat for toasting operation.

Thus as soon as the timing mechanism is manually set up, the heating elements are immediately energized to generate heat for cooking or toasting purposes. Heretofore, this cooking interval has been at all times of the same duration as the operating interval of the timing mechanism. This was unsatisfactory since during the initial use of the cooking appliance, such as the toaster, when the latter was cold a certain amount of heat was used in bringing the appliance to normal cooking or toasting temperature and consequently the cooking or toasting interval proper was not of sufficient duration to toast the bread to the required degree.

In the present invention this difference in temperature of the appliance during the initial and subsequent operations is taken care of automatically by the provision of a thermostat or temperature responsive means which hold the timing mechanism after its manual operation inoperative until the appliance has reached the proper cooking temperature so that the operating interval of said timing mechanism does not take place simultaneously with the cooking interval but is delayed and commences only after the proper temperature has been reached.

This temperature responsive means consists of a thermostatic bar 32 arranged against the underside of bottom wall 19 transversely of the toaster. One end of said bar is fixed to said wall, as indicated at 34, and the other end is free and is provided with a downwardly projecting finger 35. A lever 36 is fulcrumed near one end 36a on an arm 37, as indicated at 38, and finger 35 is adapted to engage and depress said end 36a when the thermostat 32 is actuated by the heat. Said lever extends toward timing mechanism 25 and the other end 36b of said lever terminates adjacent to the balance wheel 25a of mechanism 25 and is adapted to engage said wheel and thereby hold said mechanism inoperative. Arm 37 is stationarily mounted in any suitable manner, and preferably is secured to the frame of the timing mechanism.

As the thermostatic bar 32 is arranged centrally and transversely of the bottom wall 19 and the timing mechanism is arranged to one side of the transverse axis of said toaster, arm 37 and lever 36 are disposed obliquely between the balance wheel 25a and finger 35.

When the toaster is closed and its temperature is below a predetermined degree, thermostat 32 occupies raised position and its finger 35 is disengaged and spaced a suitable distance from the end 36a of lever 36, while the opposite end 36b of the latter, due to its weight, occupies depressed position and rests on said balance wheel 25a, thereby preventing automatic operation of said timing mechanism.

When the temperature of the toaster is raised to the desired degree, the thermostatic bar moves downwardly at its free end, thereby bringing the finger 35 against the end 36a, depressing the same and causing the opposite end 36b to move upwardly away from the balance wheel 25a. This releases the timing mechanism and the latter is automatically set in operation and will run for a predetermined period of time at the completion of which it will release lever 29 and through it and link 30 actuates switch 26 to open the toasting circuit of the toaster. Thus the timing mechanism is not set in operation until the temperature of the toaster reaches the desired degree and the interval of operation of said mechanism is independent of the manual setting of the latter and of the switch and is conditional upon the proper temperature of the toaster only.

In order to permit the operation of the timing mechanism at different temperatures, an adjusting member 39 is pivotally mounted on plate 22 and is operable to actuate lever 36 so that its engagement by the thermostat 32 is delayed or accelerated. As shown, this adjusting member is pivotally mounted at 40 on said plate 22 and has a downward projection 41 extending through an arcuate opening 42 in said plate into engagement with a manually operable member 43. This member 43 is pivotally mounted on a pivot 40 and is manually operable to adjust lever 36. A pointer 44 is formed integral with member 43 and cooperates with graduations 45 on the underside of plate 22 to indicate the extent of adjustment. Adjusting member 39 has an extension 39a having its end bent upwardly and terminating in an edge 39b which is inclined from horizontal and bears against the underside of arm 37. Thus by adjusting member 39 the pivot end 38 of bar 37 and lever 36 can be raised or lowered, thereby accelerating or delaying the period of engagement between the thermostat 32 and lever 36.

Thermostatic element 32 can be of any usual construction, preferably consisting of a bar comprising two metallic members having different coefficients of expansion. When cold, the element lies against the underside of bottom 19, as shown in Figure 4, with the lower end of finger 35 spaced from lever 36. As the temperature in the toaster rises, element 32 curves downwardly, first bringing the finger 35 against the end 36a, and then depressing the latter and raising the opposite end 36b so as to release the balance wheel 25a of clockwork mechanism 25.

The thermostatic element 32 being placed against the underside of bottom 19 is protected against injury and is readily responsive to temperature changes in the toasting compartments. It is mounted independently of the clockwork mechanism and the switch so that both of the latter can be mounted and dismounted without interfering with the thermostat.

While I have shown and described the preferred form of my invention, it is obvious that various changes in the construction of the thermostat and parts associated therewith and in its application to the clockwork mechanism can be made and substituted for those herein disclosed without departing from the spirit of my invention.

I claim:

1. In an electric toaster having a toasting compartment, and a base therefor, the top wall of said base forming a bottom of said toasting compartment, the combination with a heating element in said toasting compartment, of an electric circuit for said element, a switch in said circuit, a timing mechanism, a handle associated with said timing mechanism, a link pivotally connected to said handle and having an operative connection with said switch, a coiled spring connected at one end to said handle for yieldably holding it in a switch opening position, said handle being manually operable to energize said timing mechanism and close said switch, a lever fulcrumed above said timing mechanism and having the end of its long arm bearing downwardly upon a part of said timing mechanism and holding the latter inoperative, a thermostatic bar disposed above said lever in juxtaposition with said top wall of said base and fixed at one end thereto and free at the other end, and a finger fixed to said free end and adapted to engage the short arm of said lever so as to depress said short arm and raise said long arm from engagement with said part of said timing mechanism and release the latter for operation when the temperature of said toaster reaches a predetermined degree.

2. In an electric toaster having a toasting compartment, heating elements therein, and a base, the top of which forms the bottom wall of said compartment, the combination of an electric circuit for said heating elements, a switch in said circuit, a timing mechanism including a balance wheel, a handle manually operable in one direction to energize said mechanism and close said switch, a coiled spring connected to said handle for restoring it and said timing mechanism to home position and moving said switch into open position, a stationary bracket, a lever fulcrumed on said bracket and having the end of its long arm bearing on said balance wheel to hold said timing mechanism inoperative, a horizontally disposed thermostatic bar arranged against the underside of said top wall of said base and having one end fixed thereto, and a downward projection fixed to the free end of said bar and adapted to engage the short arm of said lever and depress it and raise said long arm out of contact with said balance wheel, whereby said timing mechanism is rendered operative when the temperature of said toasting compartment reaches a predetermined degree and operates said thermostatic bar.

3. In an electric toaster having a toasting compartment and a base, the top wall of which forms the bottom of said toasting compartment, the combination with electric heating elements in said compartment, an electric circuit for said element, a switch in said circuit, a timing mechanism, a handle for energizing said timing mechanism and closing said switch, and a coiled spring connected to said handle for restoring it and parts associated therewith to normal position, of a lever disposed above said timing mechanism and having its long arm normally engaging part thereof so as to hold said timing mechanism inoperative, a horizontally disposed thermostatic bar arranged throughout its entire length in contact with the underside of said top wall of said base and having one end fixed thereto and having the opposite end free to move downward when the temperature of said toasting compartment reaches a predetermined degree, and a downwardly projecting finger fixed to said free end of said thermostatic bar and adapted to engage the short arm of said lever and move the long arm thereof out of engagement with said part of said timing mechanism whereby the latter is free to operate.

PAUL J. McCULLOUGH.